United States Patent
Hanton et al.

(10) Patent No.: US 6,439,883 B1
(45) Date of Patent: Aug. 27, 2002

(54) THREADING AND SCALE REMOVAL DEVICE

(75) Inventors: David J. Hanton, Vienna; George Havas, Youngstown, both of OH (US)

(73) Assignee: Ajax Magnethermic Corporation, Warren, OH (US)

(*) Notice: Subject to any disclaimer, the term of this patent is extended or adjusted under 35 U.S.C. 154(b) by 0 days.

(21) Appl. No.: 09/547,811

(22) Filed: Apr. 11, 2000

(51) Int. Cl.[7] ............................................... B21B 45/00
(52) U.S. Cl. ...................... 432/74; 266/108; 29/81.01
(58) Field of Search ........................... 29/81.01, 81.03, 29/81.04, 81.13; 72/39, 40; 266/104, 108; 432/69, 71, 74, 86

(56) References Cited

U.S. PATENT DOCUMENTS

| | | |
|---|---|---|
| 1,194,617 A | 8/1916 | Goss |
| 1,584,674 A | 5/1926 | Smith |
| 2,004,422 A * | 6/1935 | Traut |
| 3,645,046 A * | 2/1972 | Bandy |
| 3,745,293 A | 7/1973 | Seyfried |
| 4,019,282 A | 4/1977 | Cauffiel |
| 4,406,761 A | 9/1983 | Shimogori et al. |
| 4,831,854 A | 5/1989 | Bald et al. |
| 4,862,570 A | 9/1989 | Bald et al. |
| 5,036,689 A * | 8/1991 | Sekiya et al. |
| 5,069,427 A * | 12/1991 | Umlauf |
| 5,131,126 A | 7/1992 | Katsuki et al. |
| 5,143,561 A | 9/1992 | Kitamur et al. |
| 5,636,543 A | 6/1997 | Kajiwara et al. |
| 5,758,530 A | 6/1998 | Yoshikawa et al. |
| 5,923,699 A * | 7/1999 | Swanger |
| 5,990,464 A * | 11/1999 | Hino et al. |

FOREIGN PATENT DOCUMENTS

| | | |
|---|---|---|
| JP | 53-125916 | * 11/1978 |
| JP | 62-038722 | * 2/1987 |
| JP | 63-104724 | * 5/1988 |

* cited by examiner

Primary Examiner—David P. Bryant
Assistant Examiner—Eric Compton
(74) Attorney, Agent, or Firm—Fay, Sharpe, Fagan, Minnich & McKee, LLP

(57) ABSTRACT

A threading and scale removing device is disclosed which includes a heating apparatus having an inlet and an outlet. A work-piece is fed through the inlet and exits through the outlet. A plurality of rollers are operatively associated with the heating apparatus. A belt is mounted on the plurality of rollers and is adapted to rotate through the heating apparatus. As the belt rotates, it functions to thread the work-piece through the heating apparatus. Once the work-piece has been threaded through the heating apparatus, the belt functions to catch and remove metal scales that flake from the work-piece during heating. A motor is operatively connected to the plurality of rollers for driving the rollers and allowing the belt to rotate through the heating apparatus.

20 Claims, 2 Drawing Sheets

THREADING AND SCALE REMOVAL DEVICE

BACKGROUND OF THE INVENTION

The present invention pertains to an apparatus for threading metal into a heating device and for removing scales that form and flake from the metal during heating. More particularly, the present invention relates to an induction heater having a continuous belt that threads metal strip into the induction heater and removes metal scales that form and flake from the metal during heating.

Induction heating is used to heat metal pieces such as, strip, bars, slugs, billets, tubes, slabs, plate and the like, by passing the metal pieces through a pathway wherein the metal is heated by an induction coil. The purpose of the induction heating may be to permit hot rolling, annealing, hardening, brazing or soldering two parts together, or treating metal in some other manner.

One particular application of induction heaters involves their use in conjunction with the continuous casting of metal strip. Because metal strip is thin and wide having a large surface area, it cools quickly upon exiting a continuous caster. Therefore, an induction heater, such as a transverse flux coil, may be utilized to reheat the strip metal so that it can be properly rolled. A transverse flux coil is desirable because of its ability to operate in a relatively small space, and heat thin metal strip in the above Curie temperature range.

When induction heaters are utilized in conjunction with continuous casters, at least one problem arises. After the metal strip exits a continuous caster, it is soft and limp because it is hot. As a result, it is difficult to thread the metal strip horizontally through an induction heater such as a transverse flux coil. To date, there is no device that the applicant is aware of that effectively threads limp or soft metal through an induction heater. Thus, a need exists to provide such an apparatus.

An additional problem associated with induction heaters when used in any application involves the formation of metal scales during heating. All heating of metals causes at least some scale to form on the surfaces of the part undergoing treatment when the heating processes are carried out in an oxygen-containing environment such as air. Ambient air, containing oxygen reacts with the metal at elevated temperatures causing scales to form on the surface of the work-piece. As the induction heater continues to increase the temperature of the metal, the scales flake off or fall from the work-piece. The flaking off of scales into the induction heating device is an undesirable result since it often causes failure of the induction coils.

One of the most prevalent causes of failure resulting from flaking of metal scales involves short circuiting. The metal scales drop from the work-piece and accumulate between the work-piece and the inductor. As the scale builds up within the housing of the induction heater, they begin to span the space between the work-piece and the inductor. Thus, a complete circuit is formed therebetween. Since the work-piece is generally supported by metal support components of the induction heating apparatus which are grounded, a short circuit is completed to ground through the inductor and work-piece.

In an effort to alleviate some of the adverse effects accompanying a short circuit of the foregoing character, prior designs have provided a sensor for detecting a short circuit before significant damage is done. For example, in response to detection of a short circuit, a control circuit may be actuated to disconnect the inductor from its power supply. This causes the inductor to de-energize so that the necessary steps can be taken to remedy the short circuit condition. In addition, a control circuit may be rendered operable to preclude the work-piece from entering the induction heater.

While short circuit detection devices of the foregoing character advantageously serve to protect the inductor and/ or work-piece from significant damage, a considerable amount of production time is lost in shutting down the apparatus and performing the necessary maintenance operations to clear the inductor area of the metal scales causing the short. Furthermore, once the inductor area is cleaned, it is only a matter of time before scale accumulation will again cause a short to ground requiring shut-down and additional maintenance.

Another attempt to solve the problems associated with the formation of scales during induction heating is disclosed in U.S. Pat. No. 3,745,293 (Seyfried). Seyfried teaches an induction heating apparatus having an auxiliary circuit operable to cause burning of metal scales disposed between the inductor and work-piece. Such burning is achieved by establishing a low voltage circuit through the inductor and work-piece and the metal scales therebetween. By maintaining the burn-out circuit at low voltage, the metal chips are burned away and the inductor is not energized in such a manner that the work-piece is heated prematurely.

Although Seyfried was an advance in the art, the device has several shortcomings. First, the device suffers from a significant decrease in production time. In operation, Seyfried allows the scales to accumulate until a shorting would occur. Then, it shuts off the primary circuit and activates the secondary circuit. The secondary circuit or auxiliary circuit burns and eliminates the metal scales. By shutting down the primary circuit and waiting for the secondary circuit to burn off the metal scales, significant production time is lost. An additional drawback of Seyfried is the complexity and therefore increased cost of the device. It requires an additional complicated circuit. If a problem arises with the auxiliary circuit, it will likely be a difficult problem to fix.

Accordingly, there is a need in the industry to provide for an improved apparatus capable of effectively threading soft or limp metal through an induction heater that is also capable of removing scales produced during heating. The present invention contemplates a new and improved apparatus having such advantages.

BRIEF SUMMARY OF THE INVENTION

In accordance with the present invention there is provided a threading and metal scale removing device comprising a heating apparatus for heating a work-piece. The heating apparatus has an inlet through which the work-piece is threaded and an outlet through which the work-piece exits. A plurality of rollers are operatively associated with the heating apparatus. At least one rotatable belt is mounted on the plurality of rollers. The belt is adapted to thread the work-piece through the heating apparatus and remove metal scales that form and flake off the work-piece during heating. A motor is operatively connected to the rollers for driving the rollers thereby causing the belt to rotate through the heating apparatus.

In accordance with another aspect of the present invention, there is provided a metal scale removing device comprising a heating apparatus for heating a work-piece. The heating apparatus has and inlet through which the work-piece is fed and an outlet through which the work-piece exits. A plurality of rollers are operatively associated with the heating apparatus. A rotatable belt is mounted on the plurality of rollers and is adapted to catch metal scales that have fallen from the work-piece and transport the metal scales away from the heating apparatus.

One advantage of the present invention is the provision of a new threading device for induction heaters.

Another advantage of the present invention is the provision of a new and improved scale removing device for induction heaters.

Yet another advantage of the present invention is the provision of a belt rotatably disposed within an induction heater capable of effectively threading soft or limp metal material through the induction heater.

Still another advantage of the present invention is the provision of a belt rotatably disposed within an induction heater having the ability to remove metal scales that form and flake off metal materials during heating.

Still further advantages of the present invention will become apparent to those of ordinary skill in the art upon reading and understanding the detailed description of the preferred embodiment.

BRIEF DESCRIPTION OF THE DRAWINGS

The invention may take physical form in certain parts and arrangements of parts, preferred embodiments of which will be described in detail in this specification and illustrated in the accompanying drawings which form a part hereof, and wherein.

DETAILED DESCRIPTION OF THE INVENTION

Figure 1:
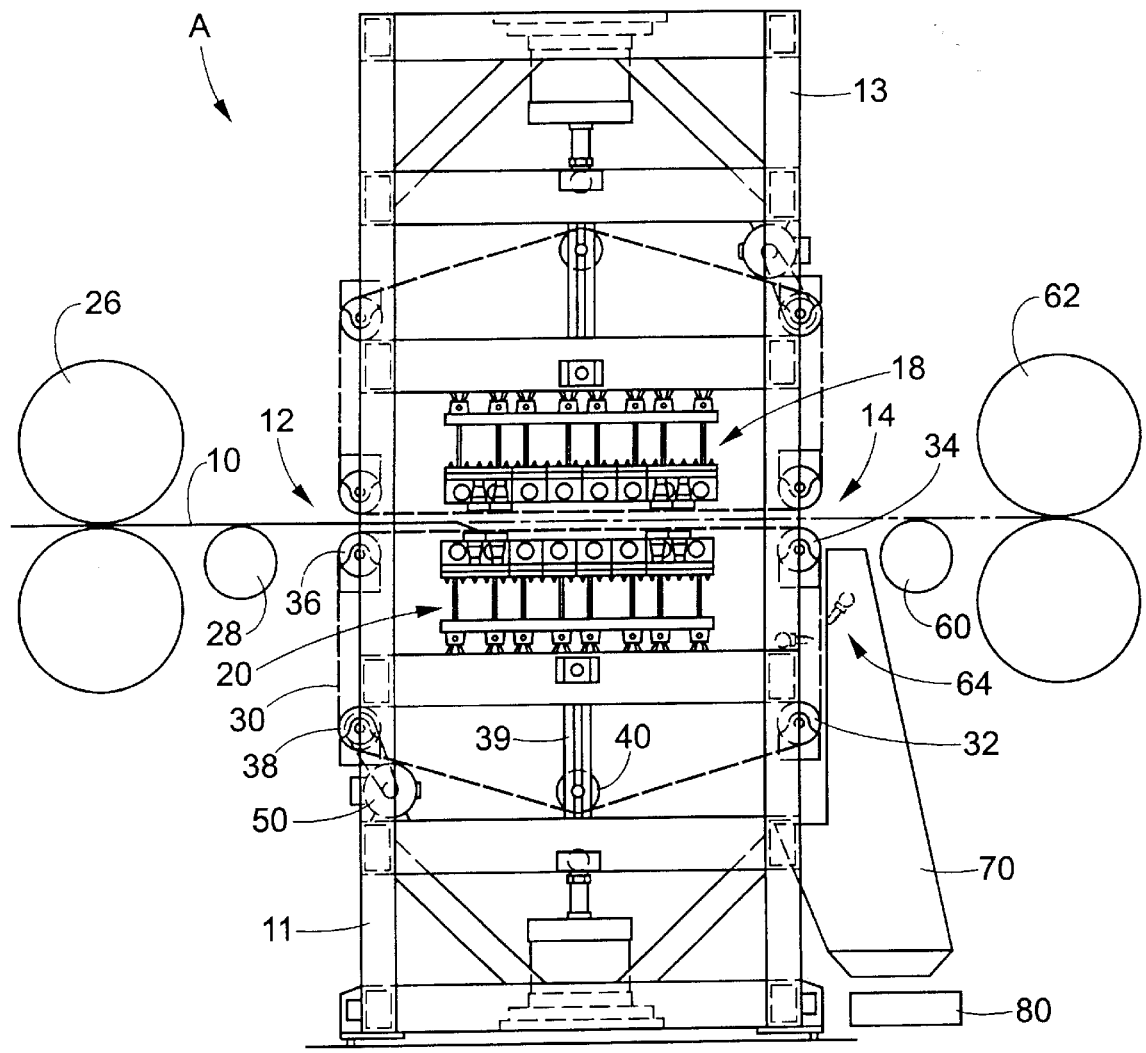
FIG. 1 is a schematic view of a threading and scale removal device in accordance with the teachings of the present invention.

Referring now to the drawings wherein the showings are for purposes of illustrating the preferred embodiments of the invention only and not for purposes of limiting the same, FIG. 1 shows a threading and scale removing device used in conjunction with an induction heater. However, it will be appreciated that the present invention may be used in conjunction with any conventional heating apparatus requiring threading of soft metal and/or scale removal.

With reference to FIG. 1, an induction heater A includes an inlet 12 through which a work-piece 10, such as a metal strip of steel or aluminum, is received. The work-piece 10 is threaded through the entry 12 and undergoes treatment before exiting through an outlet 14 located at the other side of the induction heater A. Upper and lower induction coils 18, 20 are disposed within the induction heater for applying heat to the work-piece. Frames 11 and 13 support the coils 18, 20.

In the illustrated embodiment, the work-piece 10 is soft and limp as it approaches the inlet 12 of the induction heater, having already been heated by a continuous caster (not shown) or other heating device. As such, a first tension roll set 26 is provided for receiving the work-piece and applying tension to the metal strip before it enters the induction heating assembly. Additionally, a first table roll 28 is disposed adjacent the first tension roll for receiving the strip metal from the tension roll and supporting the limp work-piece as it approaches the induction heater.

Since the strip metal 10 is still limp when it reaches the inlet 12 of the induction heater A, a threading means is provided to effectively transfer the workpiece through the induction heater. The threading means preferably includes a belt 30 adapted to rotate through the induction heater. The belt is formed from a non-metallic material that is not affected by varying the magnetic field applied by the induction heater. The belt is mounted on a series of water cooled rollers 32, 34, 36, 38 disposed around the periphery of the lower half of the induction heater A. The rollers are preferably located at the four corners of the substantially rectangular lower half of the heater. An optional tension roller 40 is disposed between the two lower rollers 36, 38 and floats in the bracket 39 for desired tensioning of the belt. A belt motor 50 drives the rollers causing the belt to rotate in a clock-wise manner.

As best seen in FIG. 1, the limp work-piece falls onto the belt 30 upon entering the induction heater. Accordingly, the belt supports the work-piece as it travels through the heating device. In a preferred embodiment, the belt and the work-piece travel at the same rate so as to prevent abrasion between the belt and the strip-metal.

Upon exiting the outlet 14 of the induction heater A, a second table roll 60 bites or grabs the work-piece 10. The strip travels over the second table roll and through a second tension roll 62. At this point, the tension applied by the second tension roll lifts the work-piece from the belt so that all slack in the strip metal is eliminated. As a result, the work-piece is fully extended along the dotted line of FIG. 1 and is no longer in contact with the belt 30.

While passing through the induction heater, the belt is exposed to extremely high temperatures emitted from the work-piece. Therefore, the belt is preferably made from a material capable of withstanding elevated temperatures, such as a ceramic material. Additionally, it is beneficial to cool the belt and minimize its exposure to these elevated temperatures. One way to accomplish this is by increasing the speed of the belt after the belt has taken a fully extended position. Once the belt is fully extended and no longer in contact with the work-piece, the rate of travel of the strip is not critical. Thus, the belt speed can be increased thereby minimizing the amount of time the belt is in the induction heater. An air spray device 64 or the water cooled rollers are used to help cool the belt.

In operation, a work-piece 10 travels through a first tension roll 26 onto a the first table roll 28. The work-piece proceeds toward the inlet 12 of the induction heater A where the belt 30 threads the work-piece through the induction heater. Upon exiting the heater at the outlet 14, the second table roll 60 bites or grabs the work-piece and transfers it to the second tension roll 62. The tension applied by the second tension roll and the table rolls causes the work-piece to become fully extended and separated from the belt 30. The work-piece continues to travel through the induction heater in this manner until threading is again required. However, the belt can also support the end of the strip as it exits the coil.

Another significant function of the belt in the present invention is its ability to remove scales that form and flake from the work-piece as it passes through the induction heater A. In almost all induction heaters where significant amounts of heat are added to a work-piece, oxygen reacts with the work-piece to form metal oxide scales on the surface of the work-piece. As the induction heater continues to heat the metal material, the scales begin to flake off the surface of the work-piece. In a conventional induction heater, the scales fall into the interior of the heating device causing a number of problems, including short-circuiting.

However, the belt 30 in the present invention prevents such problems. After the belt has threaded the work-piece 10 through the heating apparatus, it functions as a metal scale removing device. More particularly, the belt rotates beneath the work-piece thereby catching the scales that fall from the work-piece and transporting them away from the heating device. As such, the scales are prevented from falling into the interior of the heating device and causing the many problems already discussed.

In operation, a work-piece 10 such as strip metal is threaded through the inlet 12 of the induction heater. As the temperature increases, metal scales begin to flake from the surface of the work-piece. The belt 30, which moves in the same direction as the work-piece, catches the metal scales and carries them away from the induction heater. Once the belt reaches the outlet 14 of the induction heater, it makes a downward 90° turn. Inertia causes the metal scales to be separated from the belt into a chute 70 positioned adjacent the induction heater. The scales fall through the chute onto a conveyer 80 which transports and ultimately disposes of the scales.

Figure 2:
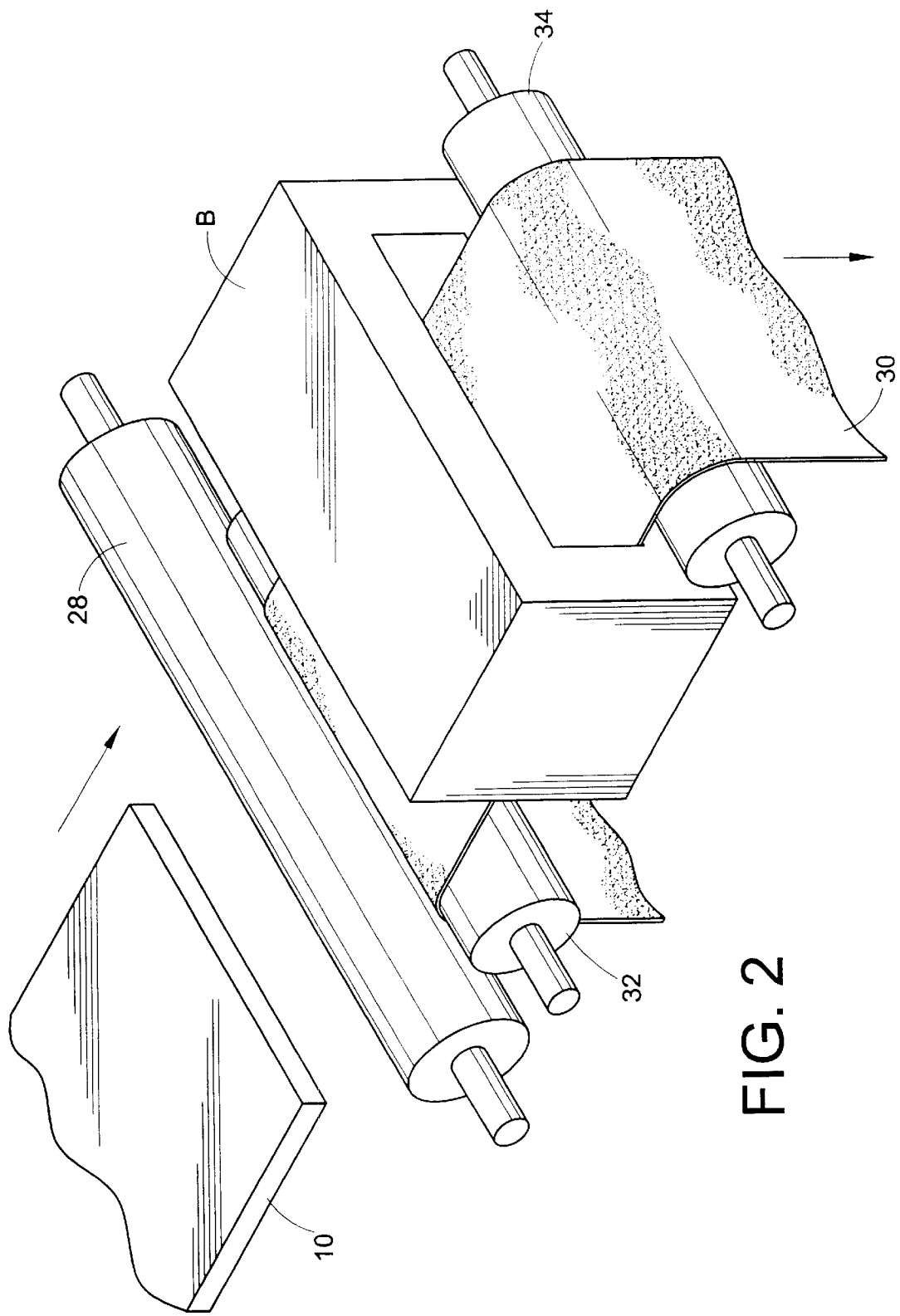
FIG. 2 is perspective view of the present invention operating solely as a scale removing device.

It must be appreciated that the metal scale removing aspect of the present invention may be incorporated into any type of induction heater or heating device, even when the threading aspect is not necessary. For example, FIG. 2 illustrates the metal scale removing device of the present invention in conjunction with an induction heating coil B for treating slabs. In this illustrated embodiment, a work-piece 10, such as a slab, is fed through the induction heating coil B. Since slabs are not limp or flimsy, the threading aspect of the invention is immaterial and is not utilized in this environment. As such, the invention acts only as a scale removing device and the table rolls and tension rolls of FIG. 1 are not required. However, at least one table roll 28 may be used to support and guide the work-piece as is shown in FIG. 2. After the work-piece has entered the heating apparatus and scales begin to fall from the slab, a belt 30, driven by rollers 32, 34 and moving in the same direction as the slab 10, catches the scales and transports them away from the coil. The metal scales fall through a chute 70 into a conveyer 80 for ultimate disposal (See FIG. 1).

As FIG. 2 illustrates, not all induction heaters need a threading device. In fact, most work-pieces are not soft and limp and therefore do not need a special threading device. Therefore, the present invention may be used solely as a metal scale removing device for any heating apparatus without having to incorporate the threading aspect of the invention. When only the scale removing aspect is desired, the table rolls and tension rolls of FIG. 1 are eliminated. However, when threading is required, the table rolls and tension rolls are provided and the belt functions as both the threading device and the scale removal device.

The invention has been described with reference to the preferred embodiments. Obviously modifications and alterations will occur to others upon a reading and understanding of this specification. For example, a second belt 90 could be disposed on the top half of the induction heater as shown in FIG. 1 to be used either in conjunction with the first belt 30 or in place of the first belt. In addition, the length of the belt may be varied in order to use a lower belt temperature rating. The present invention is intended to include all such modifications and alterations in so far as they come within the scope of the appended claims or equivalents thereof

What is claimed is:

1. A threading and metal scale removing device comprising:
    a heating apparatus for heating a work-piece having an inlet through which the work-piece is threaded and an outlet through which the work-piece exits;
    a plurality of rollers operatively associated with the heating apparatus;
    at least one rotatable belt mounted on the plurality of rollers disposed to support and thread a front end portion of the work-piece through the heating apparatus until the work-piece can be fully supported by the plurality of rollers, and wherein, the fully supported work-piece is spaced from the belt and the belt is positioned to catch and remove metal scales that form and flake off the work-piece during heating; and
    a motor operatively connected to the plurality of rollers for driving the rollers thereby causing the belt to rotate through the heating apparatus.

2. The threading and metal scale removing device of claim 1, wherein the heating apparatus is an induction heater using varying magnetic fields to heat the work-piece.

3. The threading and metal scale-removing device of claim 1, wherein the plurality of work-piece support rollers comprise:
    a first tension roll for initially receiving the work-piece and applying tension to the work-piece; and
    a first table roll disposed adjacent the first tension roll for supporting and guiding the work-piece as the work-piece approaches the inlet of the heating apparatus.

4. The threading and metal scale removing device of claim 3, further comprising:
    a second table roll disposed adjacent the outlet of the heating apparatus for grabbing and supporting the work-piece as it exits the heating apparatus; and
    a second tension roll disposed adjacent the second table roll for applying tension to the work-piece thereby eliminating sag in the work-piece and lifting the work-piece from contact with the at least one belt.

5. The threading and metal scale removing device of claim 1, wherein the at least one belt is made from a non-metallic material.

6. The threading and metal scale removing device of claim 1, wherein the at least one belt and the work-piece travel at substantially the same velocity while the at least one belt is conducting its initial threading function.

7. The threading and metal scale removing device of claim 1, wherein the at least one belt and the work-piece travel at different speeds after the at least one belt has completed its threading function.

8. The threading and metal scale removing device of claim 1, further comprising a chute adjacent the outlet of the heating apparatus for directing metal scales that fall from the at least one belt toward a conveyor for ultimate disposal.

9. The threading and metal scale removing device of claim 1, further comprising an air spray device for cooling the at least one belt.

10. The threading and metal scale removing device of claim 1, further comprising water cooled rolls near the outlet of the heating apparatus for cooling the at least one belt.

11. A metal scale removing device comprising:
    a heating apparatus for heating a work-piece, the heating apparatus having an inlet through which the work-piece is fed and an outlet through which the work-piece exits, and work-piece support rollers adjacent the inlet and outlet for supporting the work-piece in the device; and
    rotatable belt mounted on a plurality of belt rollers and disposed to be spaced from the work-piece within the heating apparatus to catch metal scales that have fallen from the work-piece and to transport the metal scales away from the heating apparatus.

12. The metal scale removing device of claim 11, wherein the heating apparatus is an induction heater using varying magnetic fields to heat the work-piece.

13. The metal scale removing device of claim 11, wherein the belt is made from a non-metallic material.

14. The metal scale removing device of claim 11, wherein the belt is made from a ceramic material.

15. The metal scale removing device of claim 11, further comprising a belt motor operatively connected to the belt rollers for driving the plurality of belt rollers and causing the belt to rotate through the inlet and outlet of the induction heater.

16. The metal scale removing device of claim 11, wherein the belt moves at a velocity greater than a velocity of the work-piece.

17. The metal scale removing device of claim 11, further comprising an air spray device for cooling the belt.

18. The metal scale removing device of claim 11, wherein the belt rollers comprise water cooled rolls near the outlet of the heating apparatus for cooling the belt.

19. The metal scale removing device of claim 11, further comprising a chute adjacent the outlet of the heating apparatus for directing metal scales toward a conveyor for ultimate disposal.

20. The metal scale removing device of claim 11, wherein the belt is at least partially disposed intermediate the work-piece and an induction heating coil for protecting the coil from fallen metal scales.

* * * * *